United States Patent
Heino

(10) Patent No.: US 9,522,496 B2
(45) Date of Patent: Dec. 20, 2016

(54) PRODUCTION METHOD OF PLASTIC PIPE IN LAYERS

(71) Applicant: PexCor Manufacturing Company Inc., Calgary (CA)

(72) Inventor: Aarne Heino, Tampere (FI)

( * ) Notice: Subject to any disclaimer, the term of this patent is extended or adjusted under 35 U.S.C. 154(b) by 281 days.

(21) Appl. No.: 13/693,966

(22) Filed: Dec. 4, 2012

(65) Prior Publication Data

US 2014/0151937 A1 Jun. 5, 2014

(51) Int. Cl.
*B29C 47/06* (2006.01)
*F16L 11/04* (2006.01)
(Continued)

(52) U.S. Cl.
CPC ......... *B29C 47/065* (2013.01); *B29C 47/8805* (2013.01); *B29C 35/06* (2013.01); *B29C 35/065* (2013.01); *B29C 47/0023* (2013.01); *B29C 47/06* (2013.01); *B29C 47/20* (2013.01); *B29C 47/26* (2013.01); *B29C 47/881* (2013.01); *B29C 47/8895* (2013.01); *B29C 71/02* (2013.01); *B29K 2995/0067* (2013.01); *B29L 2023/00* (2013.01);
(Continued)

(58) Field of Classification Search
CPC ...... F16L 9/121; F16L 11/04; F16L 2011/047; B32B 2597/00; B32B 1/08; B29L 2023/22; B29L 2023/005; B29L 2023/00; B29C 47/0023; B29C 47/0065; B29C 47/06; B29C 47/20; B29C 47/881; B29C 47/8895; B29C 71/02; B29C 35/06; B29C 35/065
See application file for complete search history.

(56) References Cited

U.S. PATENT DOCUMENTS 4,614,208 A * 9/1986 Skarelius ............. F16L 9/12
                                                138/103
5,084,352 A * 1/1992 Percec ................. B32B 27/08
                                                264/176.1
(Continued)

FOREIGN PATENT DOCUMENTS

CA      2757801      5/2012
DE       390436      7/1990
(Continued)

OTHER PUBLICATIONS

Borchardt, H., et al. "Extrusion von Rohren Aus Vernetztem Polyethylen (PE-X)", Kunstoffe International, Carl Hanser Verlag, Munchen, DE, vol. 89, No. 12, Dec. 1, 1999, pp. 74-76, XP000949627, ISSN: 0023-5563.

*Primary Examiner* — Jeffrey Wollschlager
(74) *Attorney, Agent, or Firm* — Maxey Law Office, PLLC; Stephen Lewellyn; Kyle Chapin

(57) ABSTRACT

The object of the invention is a method to produce plastic pipe where a pipe of two or more layers is extruded and where at least one layer has additive that by heat treatment releases free radicals. Immediately after the extrusion, the pipe is heat treated by leading it either through a hot salt bath or an infra-red radiation so that the mentioned additive decomposes. Now, the layer(s) having additive get crosslinked and additionally the crosslinked layer(s) fix with chemical bonds to at least one other layer.

With this method it is possible to produce a plastic pipe where there is no need to use a separate adhesion plastic layer to fix to each other layers that reject each other.

1 Claim, 1 Drawing Sheet

(51) Int. Cl.
  *B32B 1/08*    (2006.01)
  *F16L 9/12*    (2006.01)
  *B29L 23/00*   (2006.01)
  *B29C 47/20*   (2006.01)
  *B29C 47/88*   (2006.01)
  *B29C 35/06*   (2006.01)
  *B29C 71/02*   (2006.01)
  *B29C 47/00*   (2006.01)
  *B29C 47/26*   (2006.01)

(52) U.S. Cl.
  CPC ....... *B29L 2023/005* (2013.01); *B29L 2023/22* (2013.01); *B32B 1/08* (2013.01); *B32B 2597/00* (2013.01); *F16L 9/121* (2013.01); *F16L 11/04* (2013.01); *F16L 2011/047* (2013.01)

(56) References Cited

U.S. PATENT DOCUMENTS

| | | | |
|---|---|---|---|
| 5,089,352 A | | 2/1992 | Garland et al. |
| 5,093,166 A | * | 3/1992 | Nishimura .............. B32B 25/14 138/126 |
| 5,185,203 A | * | 2/1993 | Itaba et al. .................... 428/349 |
| 5,346,961 A | * | 9/1994 | Shaw et al. .................... 525/281 |
| 5,573,720 A | * | 11/1996 | Kotzer ................ B29C 47/0016 264/171.15 |
| 6,106,761 A | * | 8/2000 | Sjoberg et al. ............... 264/492 |
| 6,652,943 B2 | * | 11/2003 | Tukachinsky et al. .... 428/36.91 |
| 9,290,636 B2 | * | 3/2016 | Kazeto ..................... C08K 5/09 |
| 2004/0020547 A1 | | 2/2004 | Mahabir et al. |
| 2004/0028860 A1 | * | 2/2004 | Dalal et al. ................. 428/36.91 |
| 2004/0058162 A1 | * | 3/2004 | Tukachinsky et al. ....... 428/422 |
| 2004/0175466 A1 | * | 9/2004 | Douglas .................. B32B 27/08 426/129 |
| 2007/0044906 A1 | * | 3/2007 | Park ........................... 156/272.2 |
| 2007/0193643 A1 | * | 8/2007 | Jarvenkyla ................ B32B 1/08 138/140 |
| 2008/0017268 A1 | * | 1/2008 | Mahabir et al. ............... 138/141 |
| 2008/0317990 A1 | * | 12/2008 | Runyan et al. ............... 428/36.9 |
| 2009/0026282 A1 | * | 1/2009 | Bonnet et al. .................. 237/69 |
| 2009/0162664 A1 | * | 6/2009 | Ou .......................... C08L 29/04 428/421 |
| 2009/0169790 A1 | * | 7/2009 | Nadeau ............... B29C 47/0023 428/36.91 |
| 2009/0173407 A1 | * | 7/2009 | Bonnet et al. ................. 138/141 |
| 2011/0111153 A1 | * | 5/2011 | Russell et al. ............... 428/36.9 |

FOREIGN PATENT DOCUMENTS

| | | |
|---|---|---|
| EP | 0174611 | 3/1986 |
| EP | 1561570 | 8/2005 |
| EP | 2452801 | 5/2012 |
| FI | 20100374 | 5/2012 |
| JP | 2005-280225 | 10/2005 |
| JP | 2008055786 | * 3/2008 |

* cited by examiner

PRODUCTION METHOD OF PLASTIC PIPE IN LAYERS

FIELD OF THE INVENTION

The present invention relates generally to a method to produce plastic pipe in layers, where one of the layers is made of plastic that decreases or prevents the penetration of oxygen or other gas, and more particularly, wherein the layer may be fixed to another layer, or layers, without an adhesion layer.

BACKGROUND OF THE INVENTION

It is generally known to use a cross-linked polyethylene pipe to lead hot and cold water. By using cross-linking in a polyethylene pipe, the pipe obtains a heat tolerance, especially in long lasting usage, and in usage under pressure.

It is also generally known that the weakness of a cross-linked polyethylene pipe is its penetration of oxygen that causes, especially in circulating water systems, the increase of the oxygen content and, as a result of that, the oxidization of the metal parts of the system.

Accordingly, there is a need for an improved method to produce plastic pipe in layers.

SUMMARY OF THE INVENTION

The preferred embodiments of the present invention addresses this need by providing the reduced oxygen penetration of cross-linked polyethylene pipe by adding, to the pipe, a small layer of a polymer with the lowest oxygen penetration as possible. One example of a polymer with low oxygen penetration is ethyl vinyl alcohol, EVOH.

Because the adhesive ability of the ethyl vinyl alcohol to the polyethylene is very slight, it is necessary to put a layer of adhesion plastic between the layers of the cross-linked polyethylene and the ethyl vinyl alcohol because it sticks well to both of the materials.

Furthermore, it is known that ethyl vinyl alcohol is a water-soluble polymer. It, therefore, is usually not desirable to make it the outermost layer of a pipe in layers. Instead, a protective layer is installed to its surface that can be, for instance, polyethylene or cross-linked polyethylene. Also, this layer must be fixed to the ethyl vinyl alcohol layer using adhesion polymer.

To achieve these and other advantages, in general, in one aspect, a production method for a plastic pipe consisting of at least two layers is provided.

Numerous objects, features, and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

As a preliminary matter, it should be noted that in this document (including the claims) directional terms, such as "above", "below", "upper", "lower", etc., are used for convenience in referring to the accompanying drawings. Additionally, it is to be understood that the various embodiments of the invention described herein may be utilized in various orientations, such as inclined, inverted, horizontal, vertical, etc., without departing from the principles of the invention.

Figure 1:
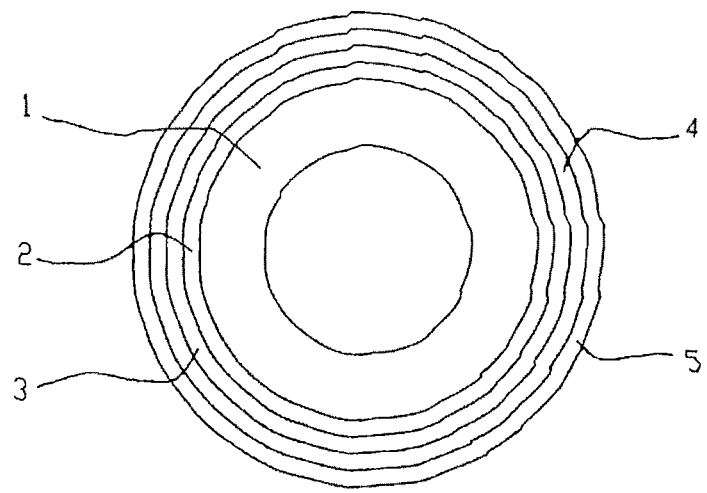
FIG. 1 is a cross-sectional view of a plastic pipe constructed in accordance with the principles of the prior art.

In FIG. 1 there is representatively illustrated a plastic pipe consisting of at least two layers, produced according to the prior art, where layer 1 is of cross-linked polyethylene, layer 2 is of adhesion polymer, layer 3 is ethyl alcohol, layer 4 is adhesion polymer, and layer 5 is either polyethylene or cross-linked polyethylene.

For example, a typical sized pipe has an outside diameter of 16 mm and wall thickness of 2 mm. The thickness of every additional layer is 0.1 mm, the cross-linked part thickness in the wall is only 1.6 or 1.7 mm depending on whether the outmost layer 5 is of polyethylene or cross-linked polyethylene. This means that, as only the cross-linked layer is taken in account in the calculations of the heat and pressure resistances, the pipe does not fill minimum requirements of the norms.

With the method of the object of the invention, it is possible to produce a plastic pipe where less additional layers are needed to obtain the same capabilities as the pipe with five layers in FIG. 1.

Polyethylene can be cross-linked mainly by three methods: by exposing to radiation, with the help of silans, or by using additives that produce free radicals when they decompose by the effect of the heat and these free radicals in turn are capable of releasing atoms from the molecular chains and thus the free reactive molecular chain parts join to each other by chemical bonds.

For instance, some organic peroxides belong to the group of these adhesives. In the method according to this invention, the last one of the mentioned has been used because that is the only one of the methods where the extrusion and cross-linking of the plastic pipe take place in the same line. If it is desired to produce a pipe according to the prior-art technique using peroxide cross-linking where there are above mentioned additional layers, the additional layers are extruded to the surface of the pipe that already has been cross-linked in a separate extrusion unit that, however, is usually in the same line with the extrusion and cross-linking of the actual pipe.

Figure 2:
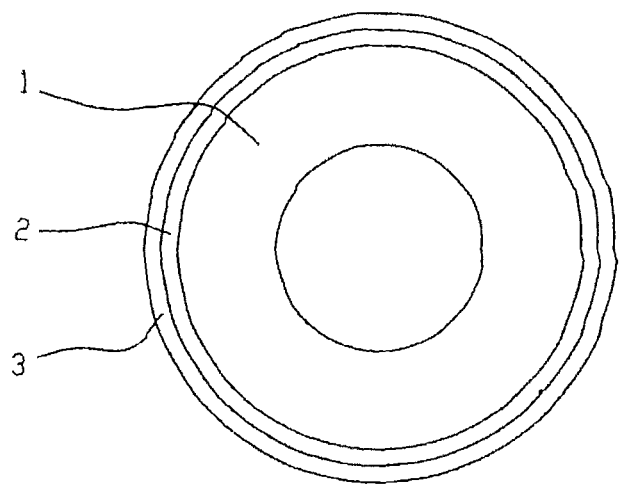
FIG. 2 is a cross-sectional view of a plastic pipe, constructed in accordance with the principles of the present invention.

FIG. 2 shows an example of a pipe that has been produced using the method according to the invention where layer 1 is of a cross-linked polyethylene, layer 2 is of an ethyl vinyl alcohol, and layer 3 is of a cross-linked polyethylene.

In the case of this example, a plastic pipe is made in one press head nozzle of the extruder and this pipe has three layers. The innermost layer is of polyethylene and the before mentioned additives, that form free radicals when decomposing, have been mixed to it, like organic peroxide. The middle layer is of ethyl vinyl alcohol, and the outmost layer is of the same material as the innermost layer.

Immediately after the extruder nozzle, the pipe goes through either a hot salt bath or an oven with infra-red radiation. In this phase, the pipe construction temperature is raised to the level that the before mentioned additive decomposes, causing two things. First, the innermost and outmost layers get cross-linked, and second, the free radicals caused by the decomposing of the additives release atoms in the layer surfaces from ethyl vinyl alcohol molecules and thus chemical bonds are formed between the ethyl vinyl alcohol layer and the cross-linked polyethylene layer, binding the layers to each other without any separate adhesion polymer.

In this way, the layer structure of FIG. 2 is obtained, where there is a 1.9 mm cross-linked polyethylene of the wall of 2 mm in comparison with construction of FIG. 1 that means a more favorable situation than in FIG. 1 as to pressure and heat tolerance.

The method of the object of the invention can vary in details widely as stated in the claims. Nevertheless, it will be understood that various modifications may be made without departing from the spirit and scope of the invention. Accordingly, other embodiments are within the scope of the following claims.

What is claimed is:

1. A process for producing a cross-linked multiple layer pipe including a barrier layer, comprising the steps of:
   a) co-extruding a first material and a second material to produce a pipe having a first layer of said first material, a second layer of said second material, and a third layer of said first material, wherein said first material is polyethylene and includes organic peroxide as an additive that forms free radicals when it decomposes, and wherein said second material is ethyl vinyl alcohol and prevents oxygen from flowing across said first and said third layers; and
   b) heat treating said pipe in a single step to cross-link said first and third layers and to decompose said additive to produce free radicals, said free radicals release atoms from said second material and thus chemical bonds are formed between said second material and said first material, binding said first layer, said second layer, and said third layer to each other without any separate adhesion polymer, wherein said heat treating is a hot salt bath.

* * * * *